March 1, 1932.  W. P. BLANCHARD  1,847,918
RECORDING INSTRUMENT
Filed March 14, 1929   2 Sheets-Sheet 1
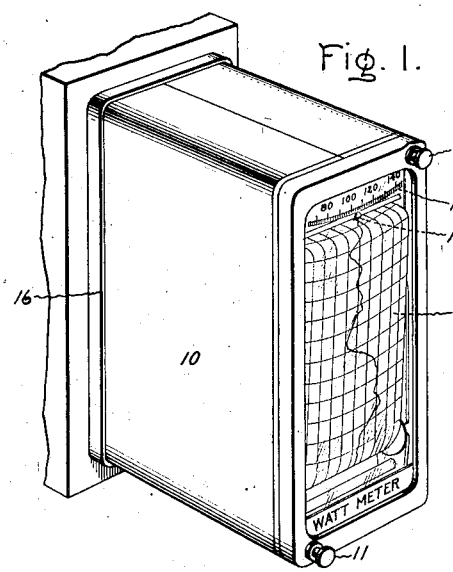
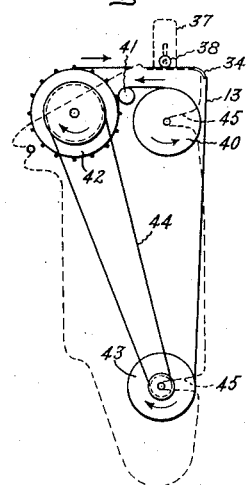
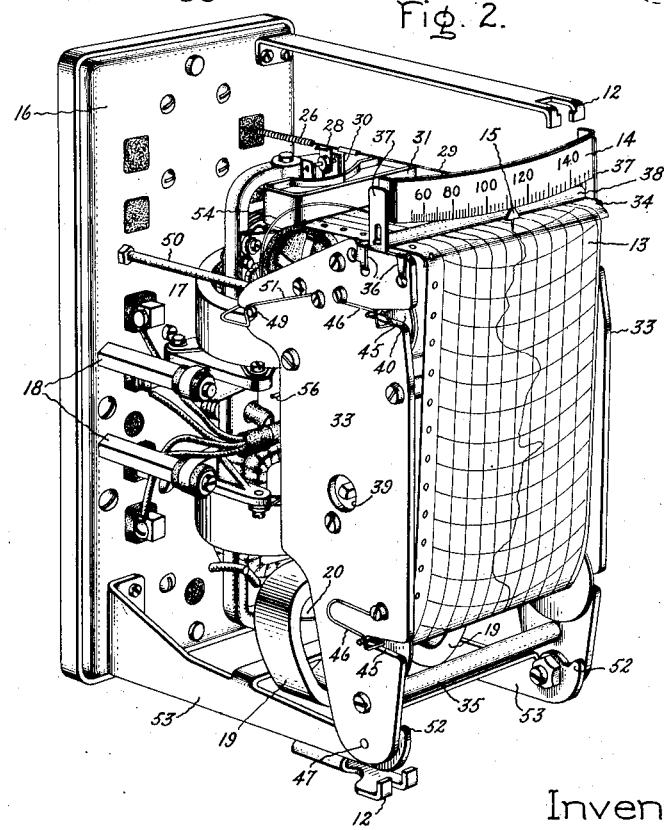
Inventor:
Walter P. Blanchard,
by Charles E. Fuller
His Attorney.

March 1, 1932. W. P. BLANCHARD 1,847,918
RECORDING INSTRUMENT
Filed March 14, 1929 2 Sheets-Sheet 2
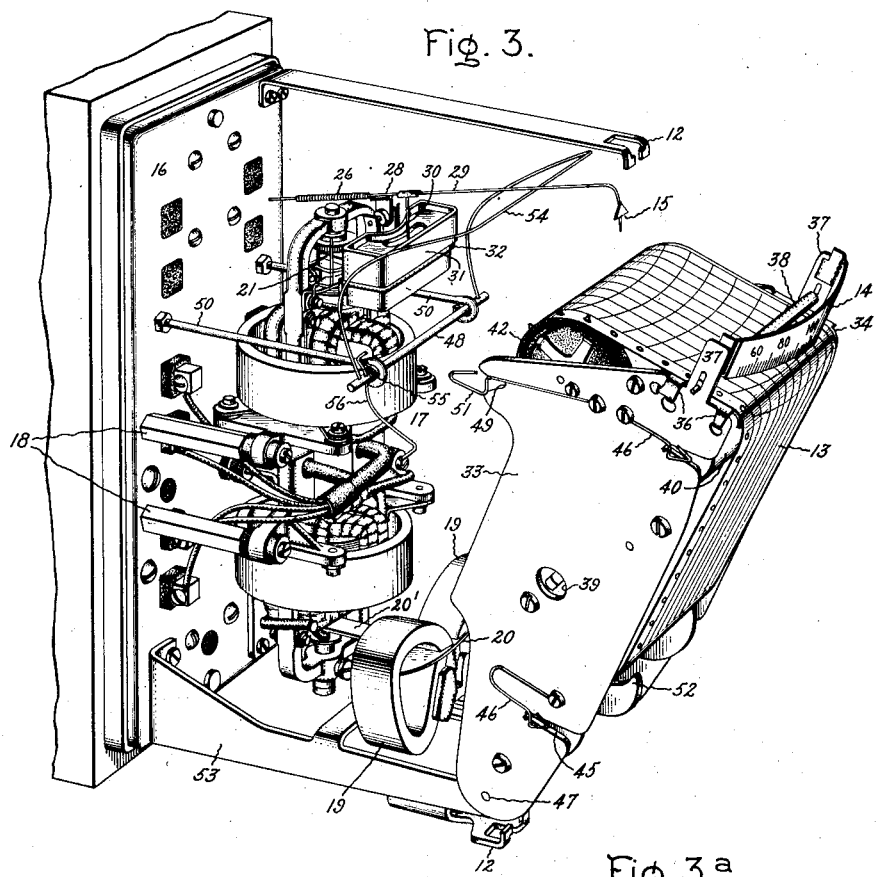
Fig. 3.
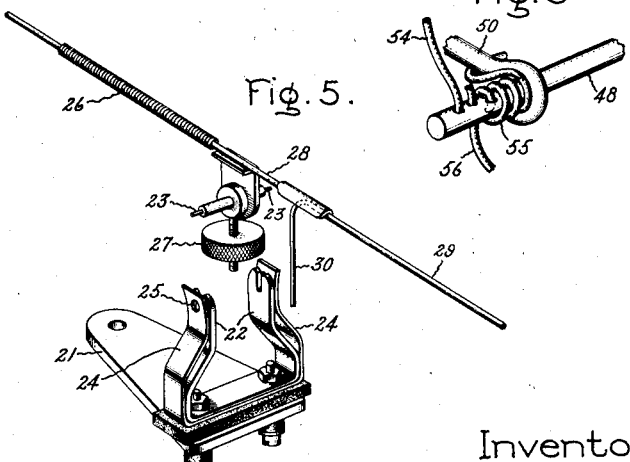
Fig. 3a.
Fig. 5.
Inventor:
Walter P. Blanchard,
by Charles E. Fuller
His Attorney.

Patented Mar. 1, 1932

1,847,918

UNITED STATES PATENT OFFICE

WALTER P. BLANCHARD, OF WINTHROP, MASSACHUSETTS, ASSIGNOR TO GENERAL ELECTRIC COMPANY, A CORPORATION OF NEW YORK

RECORDING INSTRUMENT

Application filed March 14, 1929. Serial No. 347,104.

My invention relates to recording instruments and in particular to improvements relative to their design and housing intended to provide a rugged, compact low cost instrument requiring a minimum amount of space when mounted on a switchboard and at the same time providing for ease of inspection and repair and the exposure of a considerable length of record. Another object of my invention is to provide automatic means for lifting the recording pen from the record sheet whenever the chart carrier is removed from recording position into a position to facilitate inspection of the instrument or renewal of the chart.

The features of my invention which are believed to be novel and patentable will be pointed out in the claims appended hereto. For a better understanding of the invention, reference is made in the following description to the accompanying drawings, which show in Fig. 1 a perspective view of the instrument with the removable cover in place as when in the normal operating condition; Fig. 2 shows a similar view with the cover removed; Fig. 3 shows the instrument with the cover removed and the chart carrier swung into a position to facilitate inspection; Fig. 3a is a detail view of spring 55, Fig. 3; Fig. 4 is a side view of the chart rollers with the carrier frame indicated in dotted lines; and Fig. 5 is a perspective detail view of the pen mounting with the pen being removed.

The instrument is shown in Fig. 1 as normally mounted on a switchboard. The interior assembly is arranged to permit of the parallelopiped shape of the instrument casing which in turn permits the mounting of a maximum number of instruments on a given switchboard space. The cover 10 is removable from the front by means of two catches the handles of which extend through the front cover at 11. These catches cooperate with the slotted members 12 (see Fig. 2) extending from the base inside the cover to securely hold the cover in place while permitting easy removal. Practically the entire front of the cover is made of glass of a width corresponding substantially to the width of the record chart 13. The indicating scale 14 and combined pointer and pen 15 is seen at the top just back of the glass window and the recording chart is drawn downward from top to bottom of the window, thereby exposing to the best advantage the scale, pen and the maximum possible amount of chart subsequent to the making of a record. Practically the entire front of the instrument is thus utilized in the manner of a picture frame to expose the indication and record which is a desirable arrangement on a crowded switchboard.

The cover has top, bottom and side pieces extending to the base plate 16 so that when removed the interior mechanism of the instrument is advantageously exposed from all points but the back and very readily accessible for inspection and repair, particularly when the chart carrier frame is swung forward, as in Fig. 3.

The measuring instrument here represented in general by the reference character 17 is of the polyphase electrical indicating type having two motor elements mounted on the same vertical shaft. The instrument is supported on pillars 18 extending from the base and the circuit connections are carried through the base for back connections. The instrument is provided with an induction damper comprising the stationary permanent magnets 19 and conducting sector 20 secured to the instrument shaft by arm 20'. This damper is placed near the bottom between the instrument shaft and chart carrier where there is space available without undue crowding of the parts. By placing it to the front of the instrument the latter may be mounted close to the base plate. Near the upper end of the instrument shaft there is mounted the forwardly extending plate 21 for supporting the recording pen, as best shown in Fig. 5. This plate carries upwardly extending slotted bearing supports 22 and the pen arm 28 is provided with horizontal pivots 23 adapted to rest in the slots of parts 22. Spring clips 22 having openings 25 opposite the normal position of pivots 23 are provided outside parts 22 for the purpose of preventing the pen from accidentally getting out of operation position. To assemble these parts, spring clips 24 are sprung apart slightly and pivots 23 dropped into the slots in supports 22. Then clips 24 are released and the openings 25 loosely engage the pivots 23. The pen arm is provided with an adjustable counterweight 26 to the rear of the pivot and an adjustable weight 27 below the pivot. Weight 27 lowers the center of gravity of the pen and permits the center of gravity to be nicely adjusted with respect to the horizontal axis of rotation on pivots 23. These adjustments are desirable for the most satisfactory recording operation of the pen. The recording end of the pen arm comprises a tube 29 having a portion 30 extending downward into an ink reservoir 31. The ink well 31 may be lifted out of the holding frame 32 to facilitate cleaning and filling. Its top has a curved opening having such dimensions as to accommodate the free swing of the pen about the vertical axis of rotation. Both the pen assembly and ink well are thus easily accessible and removable for shipment, cleaning and repair. The tube 29—30 permits the ink to flow to the pen point by a capillary siphoning action.

The chart carrier consists of a light metal frame comprising sheet metal side and top pieces 33 and 34 and one or more spacing bolts 35. The top piece 34 in addition to comprising the upper cross-support for the frame serves as the table and support for the record sheet. It has integral offset tabs 36 pressed into corresponding openings in the side pieces to hold the parts together. Upstanding taps 37 support the scale 14 and a roller 38 resting on the record sheet above the table just to the rear of the pen point.

The pen point is provided with a suitable indicator 15 cooperating with the lower edge of scale 14. The part 15 is carried by the pen point closely adjacent to the rear lower edge of the scale but without touching it when the parts are in operating position. The chart carrier supports the necessary guiding and driving rollers for the chart and a clock mechanism for operating the chart. The clock is not shown but is placed in the space between the top and bottom spools. The winding arbor may be seen through an opening at 39.

Fig. 4 shows the operating arrangement for the chart. 40 is the supply roll, 41 a guide roller, 42 the main driving drum or feed roller, the operation of which is timed by the clock, and 43 the reroll. The direction of movement of the chart is shown by the arrows in Fig. 4. The driving drum 42 and reroll 43 are provided with pulleys and connected together by a resilient belt 44 which permits slipping to maintain the chart wound up and at the same time providing for the change in diameter of the roll on the spool at 43. The spools or rollers 40 and 43 have to be changed periodically to renew the chart and to facilitate their removal their shaft extensions at either end merely rest in slots 45 in the side plates and are removably held in place by spring catches 46. It will be noted that the arrangement is such that both of these spools are changeable from the front of the instrument and that the guide roll 41 and driving drum are easily accessible for the feeding in operation when a new roll is started before the chart has been drawn down in front of the roll 40.

The chart carrier frame and all the parts carried thereby is rotatable as a unit about pivots 47 from the operating position shown in Figs. 1 and 2 to and beyond that shown in Fig. 3. The chart carrier's postion is fixed in the operating position by the stop bar 48 which then abuts against the side pieces at points 49. A spring catch 51 secured to the side members of the frame engages the opposite ends of the bar 48 when the parts are in their operating position. The forward movement of the chart carrier is limited by reason of the bar 35 coming in contact with the stop parts 52 at the front of the lower supporting member 53 extending forward from the base 16. The chart carrier may be removed entirely by removing the pivot pins at 47.

As best shown in Fig. 3 the stop bar 48 is rotatably supported adjacent its two ends by rods 50 rigidly secured to the base 16 and extending to either side and forward of the instrument assembly 17. The bar 48 carries a pen lifter in the form of a wire bail 54. This pen lifter is automatically operated to lift the pen from the chart whenever the chart carrier is moved from the operating position to the position shown in Fig. 3. The reverse operation takes place when the chart carrier is moved back into operating position. These operations are caused by the rotation of bar 48. The bar is rotated in a counter-clockwise direction to lift the pen by reason of a small coiled spring 55 secured between one of the rods 50 and bar 48.

Fig. 3a shows an enlarged view of this detail. Spring 55 is properly tensioned to rotate bar 48 in a counter-clockwise direction. The bar 48 is rotated in the clockwise direction to lower the pen by the lever 56. Lever 56 is a stiff wire which passes through an opening in bar 48 and has a downwardly extending part with a lateral bend at its lower end against which the rear edge of side frame 33 rests when the parts are in the operating position. In the movement of the chart carrier to operating position it comes against lever 56 and turns rod 48 in a clockwise direction during the latter part of the movement. The upper end of lever 56 is turned over the rod 50 and serves to limit and cushion the upward movement of the pen lifter when the chart carrier is drawn forward. These parts are so adjusted that the pen is in contact when the parts are in operating position but is gently but quickly lifted from the chart over roller 38 in the initial part of the forward movement of the chart carrier and vice versa, whereby the pen is prevented from being damaged and the making of a false record on the chart by reason of the pen dragging on the chart is avoided.

In the description of my invention I realize of course that I have included certain features which, broadly speaking, are old. In the appended claims I aim to set forth the patentable features of my invention in terms which, while distinguishing from the prior art, are sufficiently comprehensive to include obvious modifications of my improvements.

What I claim as new and desire to secure by Letters Patent of the United States is:

1. In a recording device, a base plate, a measuring instrument secured thereto, a chart carriage in front of said instrument, a recording chart movably supported on said carriage, a pen movable by said instrument and to record on said chart, means whereby said carriage may be swung away from an operating position adjacent said instrument and vice versa, and means responsive to such movements for removing the recording pen from said chart as the carriage is swung from the operating position and replacing it again on said chart when the carriage is returned to its operating position.

2. In a recording device, a measuring instrument, the movable element of which is rotatable about a vertical axis, a recording chart carriage comprising a vertical framework pivoted at its bottom on a horizontal axis in fixed relation to said measuring instrument and arranged to have its upper portion alternately swung toward and away from said instrument, a horizontal table near the top of said carriage, a record sheet movable over said table, a pen movable by said measuring instrument and to record on the record sheet above said table when the carriage is in its operating position adjacent said instrument, and means responsive to the initial movement of said carriage away from said instrument for lifting the pen from said record sheet.

3. In a recording instrument, a measuring instrument having its movable element rotatable about a vertical axis, a recording chart carriage pivoted at its bottom about a horizontal axis in fixed relation with said instrument, whereby the carriage may be swung from an operating position adjacent said instrument, away therefrom to a position permitting free access to its operating parts, said carriage comprising a framework with vertical side pieces and a horizontal table at its top, a record sheet supported on horizontal rollers extending between said side pieces and movable over said table, a pen movable by said measuring instrument across said record sheet above the table when the carriage is in operating position, a horizontal bar rotatably supported between said instrument and carriage adapted to contact with the side pieces thereof and position the carriage in its operating position, a pen lifter secured to said bar and operated by its rotation, and automatic means for rotating said bar in one direction to lift the pen from the recording chart during the initial movement of the chart carriage away from operating position and for returning the pen to the chart during the final movement of the carriage to operating position.

4. In a recording instrument having a removable cover and comprising a base plate, a measuring instrument having a movable element supported on a vertical axis of rotation direction to lift the pen from the recording chart carriage supported from the base plate in front of and closely adjacent to said instrument, said recording chart carriage having a driving drum, horizontal table, and chart supply spool near its top and adjacent the upper extremity of the measuring instrument, a reroll spool near the bottom of said carriage, and a recording pen movable by said instrument over said table, said carriage being pivoted at its bottom about a horizontal axis, whereby when the instrument cover is removed the chart carriage may be swung about said axis, away from its operating position adjacent the measuring instrument to a position permitting free access to the operating parts of the measuring instrument.

In witness whereof, I have hereunto set my hand this 11th day of March, 1929.

WALTER P. BLANCHARD.

CERTIFICATE OF CORRECTION.

Patent No. 1,847,918.                                   Granted March 1, 1932, to

WALTER P. BLANCHARD.

It is hereby certified that error appears in the printed specification of the above numbered patent requiring correction as follows: Page 1, line 97, for the numeral "22" read 24; page 2, line 58, before the numeral "43" insert the word "spool"; page 3, line 83, claim 4, strike out the words "direction to lift the pen from the" and insert instead closely adjacent the base plate, a; and that the said Letters Patent should be read with these corrections therein that the same may conform to the record of the case in the Patent Office.

Signed and sealed this 5th day of April, A. D. 1932.

M. J. Moore, (Seal)                                   Acting Commissioner of Patents.